United States Patent [19]

Ishida et al.

[11] Patent Number: 5,500,242
[45] Date of Patent: Mar. 19, 1996

[54] HIGHLY WATER ABSORBED RICE AND METHOD OF PRODUCING THE SAME, ULTRA-HIGHLY WATER ABSORBED RICE AND A VARIETY OF RICE PRODUCTS UTILIZING THE SAME

[75] Inventors: Yukio Ishida, 1-15, Ejirihigashi 2-chome, Shimizu-shi, Shizuoka-ken 424; Hiroyasu Fukuba, Tokyo, both of Japan

[73] Assignees: Yukio Ishida, Shizuoka; Japan Energy Corporation, Tokyo, both of Japan

[21] Appl. No.: 280,988

[22] Filed: Jul. 27, 1994

[30]   Foreign Application Priority Data

Jul. 28, 1993 [JP] Japan ..................... 5-204473
Jul. 14, 1994 [JP] Japan ..................... 6-184129

[51] Int. Cl.⁶ ........................... A23L 1/182; A23L 1/164
[52] U.S. Cl. ........................... 426/618; 426/455
[58] Field of Search ..................... 426/618, 455

[56]   References Cited

U.S. PATENT DOCUMENTS 5,316,783  5/1994  Kratochvil et al. .

FOREIGN PATENT DOCUMENTS

| 57-115151 | 7/1982  | Japan . |
| 59-118055 | 7/1984  | Japan . |
| 60-16559  | 1/1985  | Japan . |
| 2291235   | 12/1990 | Japan . |
| 3198756   | 8/1991  | Japan . |
| 4218348   | 8/1992  | Japan . |
| 422491    | 1/1935  | United Kingdom . |
| 2020160   | 11/1979 | United Kingdom . |

*Primary Examiner*—Donald E. Czaja
*Assistant Examiner*—Choon P. Koh
*Attorney, Agent, or Firm*—Browdy and Neimark

[57]   ABSTRACT

The present invention relates to highly water absorbed rice produced by a process comprising a first step of turning immersed rice into water absorbed rice at a water content of 42 to 72 parts by weight to 100 parts by weight of rice by using hot water no less than 65° C. and/or steam or pressurized steam, a second step of immersing the resulting water absorbed rice into cold water at 0° to 25° C., preferably 5° to 15° C. while the rice is in the state where the temperature of the rice is nearly maintained at the temperature of the hot water, and/or steam and the like for use in the above heating of the rice, to generate water absorbed rice at a water content of 50 to 85 parts by weight of water to 100 parts by weight of raw rice, and a third step of charging the water absorbed rice into warm water at 25° to 60° C., preferably 30° to 55° C. to adjust the water content to 75 to 110 parts by weight of water to 100 parts by weight of raw rice.

In accordance with the present invention, the generation of turbidity due to micro-particles of starch can be successfully reduced by immediately immersing the rice from the first step into cold water at a temperature of 0° to 25° C., preferably 5° to 15° C. at the second step while the rice maintains the heating temperature of the first step.

10 Claims, No Drawings ical Field of Utilization

HIGHLY WATER ABSORBED RICE AND METHOD OF PRODUCING THE SAME, ULTRA-HIGHLY WATER ABSORBED RICE AND A VARIETY OF RICE PRODUCTS UTILIZING THE SAME

DETAILED DESCRIPTION OF THE INVENTION

Industrial Field of Utilization

The present invention is to provide rice pretreated with a water absorption process. The highly water absorbed rice or the ultra-highly water absorbed rice, in accordance with the present invention, can produce delicious boiled rice through simple heating at home, super markets, Japanese food restaurants and other restaurants.

Prior Art and Problems

In accordance with the present invention, it has been found that the process of producing highly water absorbed rice proposed previously (PCT/JP93/00134) has one drawback.

The previous process of producing the highly water absorbed rice comprises a first step of making 100 parts by weight of rice absorb 45 to 100 parts by weight of water, charging the rice into warm water at a temperature above 25° C., and subjecting the rice to a process including refrigeration, freezing, freezing after refrigeration and refrigeration after freezing, and a second step of further making the rice absorb water to adjust the total water absorption level to a ratio of 72 to 130 parts by weight of water to 100 parts by weight of rice. When the rice is immersed in warm water above 25° C., micro-particles of starch disperse into the water, rapidly turning the water turbid. Thus, fresh warm water above 25° C. has to be charged therein to exchange the water, so as to prevent the starch particles from adhering to rice surfaces and reducing water absorption. Additionally it was found that the productivity of the highly water absorbed rice was reduced.

Means for Solving the Problems

In accordance with the present invention, the generation of the turbidity due to micro-particles of starch can be successfully reduced by immediately immersing the rice into cold water at 0° to 25° C., preferably 5° to 15° C. at the second step of the process of producing highly water absorbed rice while maintaining the heating temperature of the first step. The process of producing highly water absorbed rice or/and ultra-highly water absorbed rice can be made into a continuous through process, which enables almost no reduction of the productivity of such rice. The above advantages bring about the marked improvement in the industrial productivity together with the reduction in construction costs and running costs.

The present invention essentially relates to highly water absorbed rice produced by a process comprising a first step of turning immersed rice into water absorbed rice at a water content of 42 to 72 parts by weight to 100 parts by weight of raw rice by using hot water no less than 65° C. and/or steam or pressurized steam, a second step of immersing the resulting rice into cold water at 0° to 25° C., preferably 5° to 15° C. while the rice is in the state where the temperature of the rice is nearly maintained at the temperature of the hot water, and/or steam and the like for use in the above heating of the rice, to prepare water absorbed rice at a water content of 50 to 85 parts by weight of water to 100 parts by weight of raw rice, and a third step of charging the water absorbed rice into warm water at 25° to 60° C., preferably 30° to 55° C. to adjust the water content to 75 to 110 parts by weight of water to 100 parts by weight of raw rice.

The highly water absorbed rice of the present invention is produced by a process comprising a first step of preheating immersed rice in water at about 50° C. for about 3 minutes if necessary and heating the rice by using hot water no less than 65° C. and/or steam or pressurized steam for about 20 seconds to 45 minutes to prepare water absorbed rice at a water content of 42 to 72 parts by weight to 100 parts by weight of rice, a second step of immersing the resulting water absorbed rice into cold water at 0° to 25° C., preferably 5° to 15° C. while the rice is in the state where the temperature of the rice is nearly maintained at the temperature of the hot water, and/or steam and the like for use in the above heating of the rice, to prepare water absorbed rice at a water content of 50 to 85 parts by weight of water to 100 parts by weight of raw rice, and a third step of charging the water absorbed rice into warm water at 25° to 60° C., preferably 30° to 55° C. for about 10 minutes to 60 minutes to adjust the water content to 75 to 110 parts by weight of water to 100 parts by weight of raw rice.

If necessary, the highly water absorbed rice of the present invention is frozen or/and refrigerated as it is or after a variety of seasoning broth is absorbed therein at the final step. The resulting rice is stored, and can be put on the market as a rice product for steamed rice and the like.

Also, by immersing the highly water absorbed rice of the present invention into cold water at 0° to 25° C., preferably 5° to 15° C. for 5 to 60 minutes, preferably 5 to 40 minutes while the rice maintains the temperature at the third step absorption (25° to 60° C., preferably 30° to 55° C.) to adjust the water content to 90 to 120 parts by weight to 100 parts by weight of raw rice and subsequently immersing the resulting rice in warm water or a variety of seasoning broth at 25° to 60° C., preferably 30° to 55° C. for about 5 to 50 minutes, the rice can be prepared into ultra-highly water absorbed rice at a water content of 105 to 135 parts by weight of water to 100 parts by weight of raw rice.

After appropriately freezing or/and refrigerating the highly water absorbed rice of the present invention for storage, the resulting rice is immersed in water, warm water and/or soup, sauce, soup stock, vinegar, seasoning broth and the like (in the case of freezing, this process also works as thawing process) at 5° to 40° C., preferably 10° to 35° C., to prepare the rice into ultra-highly water absorbed rice at a water content of 105 to 135 parts by weight to 100 parts by weight of raw rice.

The ultra-highly water absorbed rice of the present invention can be marketed as a rice product for heating with a microwave oven, as is or after the ultra-highly water absorbed rice is frozen or/and refrigerated.

The highly water absorbed rice and the ultra-highly water absorbed rice, in accordance with the present invention, can be stored through a process of refrigerating, freezing, inactive gas charging, deoxygen process or a combination of these process, and then, the resulting rice can be marketed as rice products or used as a raw material for variations of boiled rice.

The highly water absorbed rice, ultra-highly water absorbed rice and rice products of the present invention can be charged and molded in a mold under pressure as is, and/or are heated in warm water or steam for tentative molding. Then, they are once drawn out therefrom and transferred into another mold and/or a molding frame or, a laminated bag and the like, followed by heating with warm water, steam, pressurized steam, an autoclave, direct flame, a microwave oven, and the like. Subsequently, the molded rice products can be taken out from the molding frame or the mold.

For molding rice products, the rice is charged into a mold which is then heated with warm water, steam, pressurized steam, an autoclave, direct flame, a microwave oven. In that case, by utilizing the gelatinizing or/and water absorbing and expanding power of water absorbed rice during the tentative molding or water absorbed rice during molding process, the rice is molded to prepare molded boiled rice. Furthermore, for storage after molding, the rice is frozen as is in the mold or after being removed from the mold.

In accordance with the present invention, the process of producing highly water absorbed rice is significant, comprising a first step of preheating immersed rice in water around 50° C. if necessary and thereafter turning the rice into water absorbed rice at a water content of 42 to 72 parts by weight of water to 100 parts by weight of raw rice by using hot water no less than 65° C., and/or steam or pressurized steam, a second step of cooling the rice in a forcing-in manner by immersing the rice in cold water at 0° to 25° C., preferably 5° to 15° C. for water absorption while the rice is in the state where the temperature of the rice is nearly maintained at the temperature of the hot water, and/or steam and the like for use in the above heating of the rice, to prepare water absorbed rice at a water content of 50 to 85 parts by weight of water to 100 parts by weight of raw rice, and a third step of subsequent recharging the water absorbed rice into warm water at 25° to 60° C., preferably 30° to 55° C. to prepare highly water absorbed rice at a water content of 75 to 110 parts by weight of water to 100 parts by weight of raw rice. Such process of producing water absorbed rice has never been done conventionally.

Furthermore, since the highly water absorbed rice and the ultra-highly water absorbed rice with a higher water absorption level produced from the highly water absorbed rice, in accordance with the present invention, are processed in the order of heating, cooling and heating, the process prevents turbidity of warm water and water, and a sticky surface on the rice. Therefore, the rices are suitable for a large-scale boiled rice process at larger facilities, which production line works extremely efficiently. Thus, the process promises economical large-scale production of a variety of delicious boiled rice products.

Also, the highly water absorbed rice of the present invention is suitable as a raw material for pilaf, risotto, fried rice, seasoned rice, cha-meshi (boiled rice cooked with soy sauce and seasoning broth), boiled rice cooked in a ceramic pot, and the like. Furthermore, the ultra-highly water absorbed rice of the present invention is suitable for use as a raw material of boiled rice to be cooked in a ceramic pot, boiled rice mixed with meat and other ingredients, rice gruel and the like, all of which should be cooked in a microwave oven.

Also, the boiled rice product for steamed rice in accordance with the present invention can be turned into delicious boiled rice by steaming the product at home, lunch center, and fast food stores for a short time.

The ultra-highly water absorbed rice and molded boiled rice in accordance with the present invention can be turned into delicious boiled rice when the rices are heated in a microwave oven as they are. Also, when the ultra-highly water absorbed rice is charged into its two-fold volume of water and then heated in a microwave oven, the rice is made into delicious rice gruel.

PREFERRED EMBODIMENTS OF THE INVENTION

Examples of the present invention will now be explained hereinbelow.

Example 1

Rice was washed and then immersed in water for 2 hours prior to preheating at 50° C. for 3 minutes. Then, the rice was immersed in hot water at 96° C. under heating for 55 seconds, which corresponds to the completion of a first-step water absorption. At the first-step water absorption, the water absorption level was 55 parts by weight to 100 parts by weight of raw rice, and the temperature of the rice was 95° C.

Then, the water absorbed rice at a temperature of 95° C. from the first step was charged into water at 10° C. as it was, for the process of immersion for 25 minutes, which corresponds to the completion of a second-step water absorption. The water at 10° C. was cooled under circulation, to maintain the water temperature of 10° C.

The resulting water absorbed rice was at the total water absorption level of 70 parts by weight to 100 parts by weight of raw rice.

The resulting water absorbed rice was immersed in warm water at 45° C. for 25 minutes, to produce highly water absorbed rice at the total water absorption level of 100 parts by weight to 100 parts by weight of raw rice.

Example 2

The highly water absorbed rice produced in Example 1 was divided and refrigerated in one-meal portions, which were rice products for steamed rice as they were.

Example 3

While the highly water absorbed rice obtained in example 1 still maintained the temperature of 45° C., the rice was immersed in cold water at 10° C. for 20 minutes, to produce water absorbed rice of the total water absorption level of 107 parts by weight to 100 parts by weight of raw rice.

Subsequently, the water absorbed rice was immersed in warm water at 40° C. for 20 minutes, to produce ultra-highly water absorbed rice of the total water absorption level of 115 parts by weight to 100 parts by weight of raw rice.

The resulting ultra-highly water absorbed rice was divided and frozen in one-meal portions, which were rice products for heating with a microwave oven.

Example 4

The highly water absorbed rice obtained in Example 1 was stored under freezing for 10 days, and then the frozen rice was immersed in water at 15° C. for 30 minutes, to produce ultra-highly water absorbed rice of the total water absorption level of 115 parts by weight to 100 parts by weight of raw rice.

Example 5

The highly water absorbed rice obtained in Example 1 was charged into a mold of a continuous box-type rice ball production apparatus of a boiled fish paste-plate size, at a level of seven/tenths the capacity of the mold, on which were placed cooked ingredients comprising seasoned chicken and vegetables. Over the ingredients was then charged the highly water absorbed rice, followed by closing the mold with a lid in a forcing-in manner and placing continuously the mold in a steaming tank, which was subsequently heated with steam at 105° C. for 5 minutes, to tentatively mold a stick-type rice ball.

Loosening the lid so as to release the pressure while keeping the state as it was, the mold was put into a steaming tank, followed by heating with steam at 105° C. for 20 minutes, to produce a stick-type rice ball.

Taking out the ball from the mold, the highly water absorbed rice gelatinized in the mold was firmly molded under the pressure from the swelling of the water absorbed rice, which did not readily break down. Even if the rice ball was picked up with hands while hot, the ball did not lose its shape. If the mold has thin plates with a higher heat conductivity, the rice can be steamed and/or heated for about 15 minutes while the lid is left as it is in the forcing-in manner, to gelatinize the starch of the rice to produce a firmly molded rice ball.

Example 6

The highly water absorbed rice obtained in Example 1 was charged into a mold of a continuous box-type apparatus for producing boiled rice in a plate form, at a level of eight/tenths the capacity of the mold, followed by closing the mold with a lid and placing continuously the mold in a steaming tank, which was subsequently heated with steam at 105° C. for 5 minutes prior to taking out the rice and molding the rice in the plate-form. The boiled rice molded in the plate form was then covered with bread crumbs for frying. When various ingredients were mounted on the rice in the fried form, the rice was crispy and tasted very delicious, which was a very interesting and unconventional boiled rice product with a very stylish touch.

Example 7

The rice products of Example 2 under refrigeration were charged into a mixture of garlic and onion preliminarily fried, followed by addition of and light frying together with chicken, green pepper, carrot, small shrimp, and asari (Claudiconcha; a Japanese species of shellfish). Subsequently, soup colored with saffron and stewed tomato cooked in water were poured therein, followed by seasoning with salt and pepper and heating for 5 to 6 minutes prior to steaming for several minutes, to produce delicious paelia.

Example 8

One hundred grams of the ultra-highly water absorbed rice obtained in Example 3 was charged in 200 g water and cooked as it was in a microwave oven (500 W) for 3 minutes, to produce delicious rice gruel with the shape of its rice grain still kept.

Example 9

Rice was washed and then immersed in water for 2 hours prior to preheating at 55° C. for 3 minutes. Then, the rice was immersed in hot water at 86° C. under heating for 4.5 minutes, which corresponds to the completion of a first-step water absorption. At the first-step water absorption, the total water absorption level was 58 parts by weight to 100 parts by weight of raw rice, and the temperature of the rice was 85° C.

Then, the water absorbed rice at the temperature of 85° C. from the first step was charged into water at 15° C. as it was, for the process of immersion for 20 minutes, which corresponds to the completion of a second-step water absorption. The water at 15° C. was cooled under circulation, to maintain the water temperature of 15° C.

The resulting water absorbed rice was at the total water absorption level of 75 parts by weight to 100 parts by weight of raw rice.

The resulting water absorbed rice was immersed in warm water at 55° C. for 25 minutes, to produce highly water absorbed rice at the total water absorption level of 108 parts by weight to 100 parts by weight of raw rice.

Example 10

The highly water absorbed rice produced in Example 9 was divided and refrigerated in one-meal portions, which were rice products for steamed rice as they were.

Example 11

While the highly water absorbed rice obtained in Example 9 was in the state where the temperature above 50° C. was still maintained, the rice was immersed in cold water at 15° C. for 10 minutes, to produce water absorbed rice of the total water absorption level of 113 parts by weight to 100 parts by weight of raw rice.

Subsequently, the water absorbed rice was immersed in warm water at 40° C. for 10 minutes, to produce water absorbed rice of the total water absorption level of 120 parts by weight to 100 parts by weight of raw rice.

The resulting ultra-highly water absorbed rice was divided in one-meal portions, which were rice products for heating with a microwave oven.

Example 12

The highly water absorbed rice obtained in Example 9 was poured into a mold of a continuous box-type rice ball production apparatus of a boiled fish paste-plate size, at a level of seven/tenths the capacity of the mold, on which were placed cooked ingredients comprising seasoned chicken and vegetables. Over the ingredients was then charged the highly water absorbed rice, followed by closing the mold with a lid in a forcing-in manner and placing continuously the mold in a steaming tank, which was subsequently heated with steam at 105° C. for 5 minutes, to tentatively mold a stick-type rice ball.

Loosening the lid so as to release the pressure while keeping the state as it was, the mold was put into a steaming tank, followed by heating with steam at 105° C. for 10 minutes, to produce a stick-type rice ball.

Taking out the ball from the mold, the highly water absorbed rice gelatinized in the mold was firmly molded under the pressure from the water absorption and expansion of the water absorbed rice of itself, which did not readily break down. Even if the rice ball was picked up with hands while hot, the ball did not lose its shape.

OPERATION OF THE INVENTION

In accordance with the present invention, the generation of turbidity due to micro-particles of starch can be successfully reduced by immediately immersing the rice from the first step into cold water at a temperature of 0° to 25° C., preferably 5° to 15° C. at the second step, while the rice maintains the heating temperature of the first step.

What is claimed is:

1. Highly water absorbed rice produced by a process comprising:
   (1) immersing washed rice in water to obtain immersed rice,
   (2) converting immersed rice into water absorbed rice at a water content of 42 to 72 parts by weight to 100 parts by weight of raw rice by using water in a form selected from the group consisting of hot water at a temperature of no less than 65° C. steam and pressurized steam,
   (3) immersing the resulting rice into cold water at 0° to 25° C. while the rice is in the state where the temperature of the rice is nearly maintained at the temperature of the water for use in the above heating of the rice, to prepare water absorbed rice at a water content of 50 to 85 parts by weight of water to 100 parts by weight of raw rice, and
   (4) charging the water absorbed rice into a liquid selected from the group consisting of water, sauce, soup, soup stock, vinegar, and seasoning broth at a temperature of from 25° to 60° C. to adjust the water content to 75 to 110 parts by weight of water to 100 parts by weight of raw rice.

2. A method of producing highly water absorbed rice comprising:
   (1) immersing washed rice in water to obtain immersed rice,
   (2) converting immersed rice into water absorbed rice at a water content of 42 to 72 parts by weight to 100 parts by weight of raw rice by heating the immersed rice with water in a form selected from the group consisting of hot water at a temperature of no less than 65° C., steam and pressurized steam for about 20 seconds to 45 minutes,
   (3) immersing the resulting rice into cold water at 0° to 25° C. for about 10 to 60 minutes while the rice is in the state where the temperature of the rice is nearly maintained at the temperature of the water for use in the above heating of the rice, to generate water absorbed rice at a water content of 50 to 85 parts by weight of water to 100 parts by weight of raw rice, and
   (4) charging the water absorbed rice into a liquid selected from the group consisting of warm water, sauce, soup, soup stock, vinegar, and seasoning broth at a temperature of from 25° to 60° C. for about 10 to 60 minutes to adjust the water content to 75 to 110 parts by weight of water to 100 parts by weight of raw rice.

3. A process for producing an ultra-highly water absorbed rice comprising:
   (1) immersing the highly water absorbed rice produced according to claim 1 into cold water at a temperature of from 0° to 25° C., while the rice maintains the temperature at the water absorption of step (4) of claim 1, to prepare a water absorption rice having a water content of 90 to 120 parts by weight to 100 parts by weight of raw rice; and
   (2) charging the water absorbed rice obtained in step (2) into a liquid selected from the group consisting of water, soup, sauce, soup stock, vinegar, and seasoning broth at a temperature of from 25° to 60° C. to prepare ultra-highly water absorbed rice having a water content of 105 to 135 parts by weight to 100 parts by weight of raw rice.

4. A process for producing an ultra-highly water absorbed rice comprising:
   (1) subjecting the highly water absorbed rice according to claim 1 to a procedure selected from the group consisting of freezing, refrigerating, freezing followed by refrigerating, and refrigerating followed by freezing; and
   (2) charging the rice obtained in step (2) into a liquid selected from the group consisting of hot water, soup, sauce, soup stock, vinegar, and seasoning broth at a temperature of from 5° to 40° C. to prepare ultra-highly water absorbed rice having a water content of 105 to 135 parts by weight to 100 parts by weight of raw rice.

5. A process for producing a molded rice product comprising:
   (1) molding highly water absorbed rice produced according to claim 1 in a mold;
   (2) heating said highly water absorbed rice in said mold by means selected from the group consisting of hot water, steam, pressurized steam, autoclave, direct flame, and microwave oven; and
   (3) removing said highly water absorbed rice from the mold.

6. A process for producing a molded rice product which comprises:
   (1) molding the ultra-highly water absorbed rice made according to claim 3 in a mold;
   (2) heating said ultra-highly water absorbed rice in said mold by means selected from the group consisting of hot water, steam, pressurized steam, autoclave, direct flame, and microwave oven; and
   (3) removing said highly water absorbed rice from the mold.

7. A process for producing a molded rice product comprising:
   (1) molding the ultra-highly water absorbed rice made according to claim 4 in a mold;
   (2) heating said ultra-highly water absorbed rice in said mold by means selected from the group consisting of hot water, steam, pressurized steam, autoclave, direct flame, and microwave oven; and
   (3) removing said highly water absorbed rice from the mold.

8. A highly water absorbed rice produced according to the process of claim 2.

9. An ultra-highly water absorbed rice produced according to the process of claim 3.

10. An ultra-highly water absorbed rice produced according to the process of claim 4.

* * * * *